United States Patent
Sharma et al.

(10) Patent No.: US 12,079,103 B2
(45) Date of Patent: Sep. 3, 2024

(54) PERFORMANCE TEST ENVIRONMENT FOR APIs

(71) Applicant: SAP SE, Walldorf (DE)

(72) Inventors: Shuva Ranjan Sen Sharma, Jamshedpur (IN); Mohammad Jibran Jibran Sofi, Srinagar (IN); Mayank Lakhera, Kotdwar (IN); Deven Patidar, Manawar (IN)

(73) Assignee: SAP SE, Walldorf (DE)

( * ) Notice: Subject to any disclaimer, the term of this patent is extended or adjusted under 35 U.S.C. 154(b) by 424 days.

(21) Appl. No.: 17/673,082

(22) Filed: Feb. 16, 2022

(65) Prior Publication Data
US 2023/0259446 A1    Aug. 17, 2023

(51) Int. Cl.
*G06F 11/36*    (2006.01)

(52) U.S. Cl.
CPC .............................. *G06F 11/3616* (2013.01)

(58) Field of Classification Search
CPC ............ G06F 11/3616; G06F 11/3684; G06F 11/3688; G06F 11/3664; G06F 11/263; G06F 11/277; G06F 11/3409; G06F 11/26; G05B 23/0256; G05B 19/058; G01R 31/2834; G01R 31/2894; G01R 31/3181; G01R 31/2889; G01R 31/3183
USPC ... 702/182, 186, 108, 120, 183, 1, 127, 179; 709/223, 203, 226, 224; 714/11.207, 37, 714/11.208
See application file for complete search history.

(56) References Cited

U.S. PATENT DOCUMENTS

| | | | |
|---|---|---|---|
| 7,181,485 B1 * | 2/2007 | Lau ........................... | G06F 1/14 |
| | | | 712/205 |
| 10,986,013 B1 * | 4/2021 | Theimer ............. | G06F 11/3466 |
| 11,755,559 B1 * | 9/2023 | Tankersley .......... | G06F 16/2358 |
| | | | 707/694 |
| 2015/0350019 A1 * | 12/2015 | Terayama ........... | G06F 11/3003 |
| | | | 709/224 |
| 2021/0406159 A1 * | 12/2021 | Moeller ................ | G06F 9/5083 |
| 2023/0214306 A1 * | 7/2023 | Ye ........................ | G06F 11/3433 |
| | | | 707/609 |

FOREIGN PATENT DOCUMENTS

| | | | | | |
|---|---|---|---|---|---|
| CA | 2791348 A1 | * | 9/2011 | .......... | A61B 5/0002 |
| CN | 103150264 B | * | 9/2014 | .............. | G06F 11/36 |
| CN | 111124850 A | * | 5/2020 | .......... | G06F 11/3409 |
| CN | 113010436 A | * | 6/2021 | .......... | G06F 11/3684 |

\* cited by examiner

*Primary Examiner* — Jeffrey P Aiello
(74) *Attorney, Agent, or Firm* — Buckley, Maschoff & Talwalkar LLC

(57) ABSTRACT

According to some embodiments, systems and methods are provided, comprising an Application Programming Interface (API) source; a cluster including a master node and at least one worker node; a memory storing processor-executable program code; and a processing unit to execute the processor-executable program code to cause the system to: receive, at the cluster, an API from the API source; receive, at the cluster, a customer usage value for the received API; determine a load test injection pattern for the received API based on the customer usage value; schedule execution of a load test for the received API based on the determined load test injection pattern; and execute the load test on the at least one worker node. Numerous other aspects are provided.

20 Claims, 4 Drawing Sheets

| 302 — RANGE | < 1000 | 1000–2000 | 2000–5000 |
|---|---|---|---|
| 105 — LOAD INJECTION PATTERN | PATTERN A | PATTERN B | PATTERN C |

FIG. 3

PERFORMANCE TEST ENVIRONMENT FOR APIs

BACKGROUND

An Application Programming Interface (API) is a type of software interface that allows two computers or two computer programs/applications to interact with each other without any user intervention. The API is a collection of software functions/procedures (code) that helps two different softwares communicate and exchange data with each other. Organizations may build APIs to allow users to interact with and consume data from different applications. Often, before an API is released to a user, the organization may want to execute a load test on the API. Load testing an API determines whether the API, and the underlying infrastructure, can handle an expected number of simultaneous requests/users accessing the system via the API. The load test may also be referred to as a volume test, as the load/volume test ensures that a system can handle a pre-defined volume of traffic.

Conventional load tests execute a standard pattern for increasing the load on the API irrespective of the number of users that may simultaneously access the system.

Systems and methods are desired which support configurable API load testing.

BRIEF DESCRIPTION OF THE DRAWINGS

FIG. 3 is a non-exhaustive example of a pattern map according to some embodiments.

DETAILED DESCRIPTION

Figure 1:
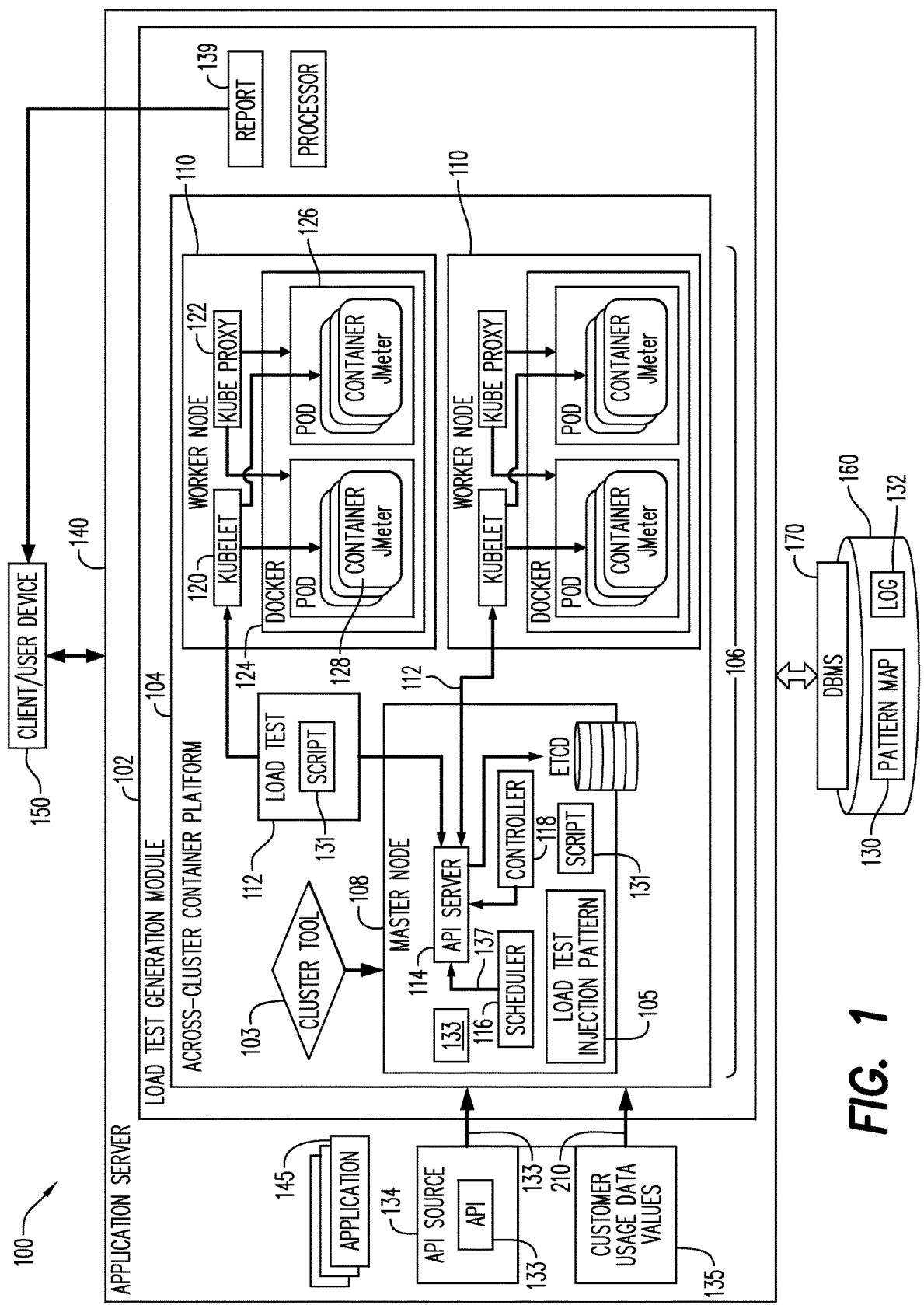
FIG. 1 is a system according to some embodiments.

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

An Application Programming Interface (API) is a software intermediary that, via a set of functions and procedures, allows two applications to communicate with each other. More particularly, the API acts as a messenger which takes a request from a requesting application to access the features or data of a target operating system, application or other service, delivers the request to the target, and returns a response to the requesting application. Non-exhaustive examples of HTTP-based APIs are Open Data Protocol (OData) and Simple Object Access Protocol (SOAP). OData is a data access protocol used to query and update data and to trigger business logic. OData is designed to provide standard Create Read Update and Delete (CRUD) access via HTTP(S) and provides for synchronous request with a response. SOAP is a protocol for exchanging information in distributed environments and is the preferred protocol for asynchronous messaging (e.g., error handling). With more platforms and technologies (e.g., applications) being used within enterprises, the APIs, which are technology independent and without a user interface, may facilitate the use of these platforms and technologies.

As described above, before an API is released, an organization may want to test the API with a load test to determine whether the API, and the underlying infrastructure, can handle an expected number of simultaneous requests/users accessing the system via the API. The load test may also be referred to as a volume test, as the load/volume test ensures that a system can handle a pre-defined volume of traffic. In load tests, APIs and users form client-server systems where multiple clients/users, in the form of virtual users, access the same server at the same time. A single machine may simulate multiple virtual users, and the use of multiple machines executing concurrently may simulate an even higher number of virtual users. The load test may execute a same or different test script repeatedly and simultaneously, where the test script includes a request to the API for data from another application/system.

Different APIs may experience different loads as different APIs may be needed more or less extensively by the user. The conventional load test is designed as a general test and not based on the expected use of the API. For example, a conventional load test may first start the test, which is the simultaneous access of the API, with fifty end users, then one hundred end users, then five hundred end users, then one thousand end users and then five thousand end users. However, not all APIs need to be tested with five thousand or even one thousand end users, for example. During testing, hardware and other resources are used by the organization, and by using the conventional general load test, the organization is consuming hardware and other resources unnecessarily for the testing.

One or more embodiments provide for a load test generation module to generate an API-specific load test for a given API. Embodiments deploy a load testing framework that uses multiple containers to create traffic/load for the API. Embodiments include a load testing master node and one or more load testing worker nodes. The load testing worker nodes may create the traffic/load for testing purposes. Embodiments determine a predicted number of users for an API. Then, based on that predicted number of users, the load testing master node of the load test generation module may generate a load injection pattern to repeatedly send requests from one or more concurrent load testing worker nodes to the API server in different amounts and at different times to simulate the API users. The master node determines the load needed to test a given API and then may design and generate a load injection pattern based on that determination, so that all APIs may not need to use a same load test. The generated pattern may load test the API with the expected traffic, without consuming hardware and other resources unnecessarily, thereby improving the overall efficiency of the system associated with bandwidth considerations (e.g., by reducing the load on a processor and/or minimizing the bandwidth and processing needs of the system). The load test generation module may be applicable to any type of API.

FIG. 1 is a block diagram of system architecture 100 according to some embodiments. Embodiments are not limited to architecture 100 or to a three-tier storage architecture.

Architecture 100 includes a load test generation module 102, a database 160, a database management system (DBMS) 170, an application server 140, application(s) 145, and clients 150. Applications 145 may comprise server-side executable program code (e.g., compiled code, scripts, etc.) executing within application server 140 to receive queries/requests from clients 150/load tests 112 and provide results to clients 150 based on data of database 160 and the output of the load test generation module 102. A client 150 may access the load test generation module 102 executing within application server 140, to generate the logs 132 and reports 139, as described further below.

The load test generation module 102 may include an across-cluster container platform 104, meant to run across a cluster. The across-cluster container platform 104 may be a Kubernetes® platform, or other suitable platform. The across-cluster container platform 104 may include one or more clusters 106 and a cluster tool 103 adapted to allow a user to run commands against the cluster. In the case of the across-cluster container platform 104 being a Kubernetes® platform, the cluster tool 103 may be kubectl. Each cluster 106 includes a master node 108 and one or more worker nodes 110. The master node 108 is a primary control unit for managing and scheduling the load tests 112. The worker nodes 110 execute the load tests 112 according to the schedule provided by the master node 108. The worker nodes 110 are the execution engine.

The master node 108 may make global decisions about the cluster 106 (for example, scheduling), as well as detecting and responding to cluster events (e.g., ceasing execution of a load test at a worker node when a given number of requests are not injected within a given amount of time). The master node 108 may include an API server 114, a scheduler 116, and a controller 118. The API server 114 may receive the APIs 133 from the API source 134. The API server 114 may also manage requests from the worker nodes 110. The scheduler 116 may schedule the number of concurrent users that will access the system, and to that end may schedule pods 126 on the worker nodes 110 based on resource utilization (e.g., individual and collective resource requirements, hardware/software/policy constraints, data locality, deadlines, etc.). The scheduler 116 may also decide where services are deployed.

The controller 118 may execute several distinct controller processes in the background to regulate how the execution of the load test injection pattern, as well as regulate the shared state of the cluster and perform routine tasks. Non-exhaustive examples of the controller processes include noticing/responding when nodes go down, creating pods to run tasks to completion, joins services & pods, etc. For example, if an API is not executing, the controller 118 may identify that the problem is with the server and not the API; and the controller may give an instruction to end the test. The controller 118 may also regulate executional standpoint data (e.g., data from the start of execution of the load test until the end of the load test execution).

Each worker node 110 may include an agent 120, a proxy 122 and a node-container platform 124. The node-container platform 124 may be Docker® or other suitable node-container platforms that may be deployed in the across-cluster container platform 104. The node-container platform 124 may include one or more pods 126. Each pod 126 includes one or more application containers ("containers") 128. The pods 126 may provide shared storage and network resources, and a specification for how to run the containers 128. The containers 128 are a runtime of an application, including software, libraries and configuration files. The containers 128 may be a main execution area that runs inside the pod 126. In some embodiments, the container 128 may include a load test tool, including but not limited to like JMeter and NeoLoad, etc. for generating the load test 112.

In the case of the across-cluster container platform 104 being a Kubernetes® platform, the agent 120 may be a kubelet. The agent 120 may ensure the containers 128 are running in a pod 126 and are in a healthy state. The pod 126 may provide information to the master node 108 regarding the workload that is deployed.

The proxy 122 may maintain any network rules on the worker node 110 that allow for the flow of traffic/load.

Application server 140 provides any suitable interfaces through which the clients 150 may communicate with the load test generation module 102 or applications 145 executing on application server 140. For example, application server 140 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 145 executing on server 140 may communicate with DBMS 170 using database management interfaces such as, but not limited to, Open Database Connectivity (ODBC) and Java Database Connectivity (JDBC) interfaces. These types of applications 145 may use Structured Query Language (SQL) to manage and query data stored in database 160.

DBMS 170 serves requests to retrieve and/or modify data of database 160, and also performs administrative and management functions. Such functions may include snapshot and backup management, indexing, optimization, garbage collection, and/or any other database functions that are or become known. DBMS 170 may also provide application logic, such as database procedures and/or calculations, according to some embodiments. This application logic may comprise scripts, functional libraries and/or compiled program code. DBMS 170 may comprise any query-responsive database system that is or becomes known, including but not limited to a structured-query language (i.e., SQL) relational database management system.

Application server 140 may be separated from, or closely integrated with, DBMS 170. A closely integrated application server 140 may enable execution of server applications 145 completely on the database platform, without the need for an additional application server. For example, according to some embodiments, application server 140 provides a comprehensive set of embedded services which provide end-to-end support for Web-based applications. The services may include a lightweight web server, configurable support for OData, server-side JavaScript execution and access to SQL and SQLScript.

Application server 140 may provide application services (e.g., via functional libraries) which applications 145 may use to manage and query the data of database 160. The application services can be used to expose the database data model, with its tables, hierarchies, views and database procedures, to clients. In addition to exposing the data model, application server 140 may host system services such as a search service.

Database 160 may store data used by at least one of: applications 145 and the load test generation module 102. For example, database 160 may store one or more pattern maps 130 or logs 132 accessed by the load test generation module 102 during execution thereof.

Database 160 may comprise any query-responsive data source or sources that are or become known, including but not limited to a structured-query language (SQL) relational database management system. Database 160 may comprise a relational database, a multi-dimensional database, an extensible Markup Language (XML) document, or any other data storage system storing structured and/or unstructured data. The data of database 160 may be distributed among several relational databases, dimensional databases, and/or other data sources. Embodiments are not limited to any number or types of data sources.

In some embodiments, the data of database 160 may comprise one or more of conventional tabular data, row-based data, column-based data, and object-based data. Moreover, the data may be indexed and/or selectively replicated in an index to allow fast searching and retrieval thereof. Database 160 may support multi-tenancy to separately support multiple unrelated clients by providing multiple logical database systems which are programmatically isolated from one another.

Database 160 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently used data) and one or more fixed disks (e.g., persistent memory for storing their respective portions of the full database).

Client 150 may comprise one or more individuals or devices executing program code of a software application for presenting and/or generating user interfaces to allow interaction with application server 140. Presentation of a user interface may comprise any degree or type of rendering, depending on the type of user interface code generated by application server 140.

For example, a client 150 may execute a Web Browser to request and receive a Web page (e.g., in HTML format) from a website application 145 of application server 140 to provide the UI via HTTP, HTTPS, and/or Web Socket, and may render and present the Web page according to known protocols. The client 150 may also or alternatively present user interfaces by executing a standalone executable file (e.g., an .exe file) or code (e.g., a JAVA applet) within a virtual machine.

Figure 2:
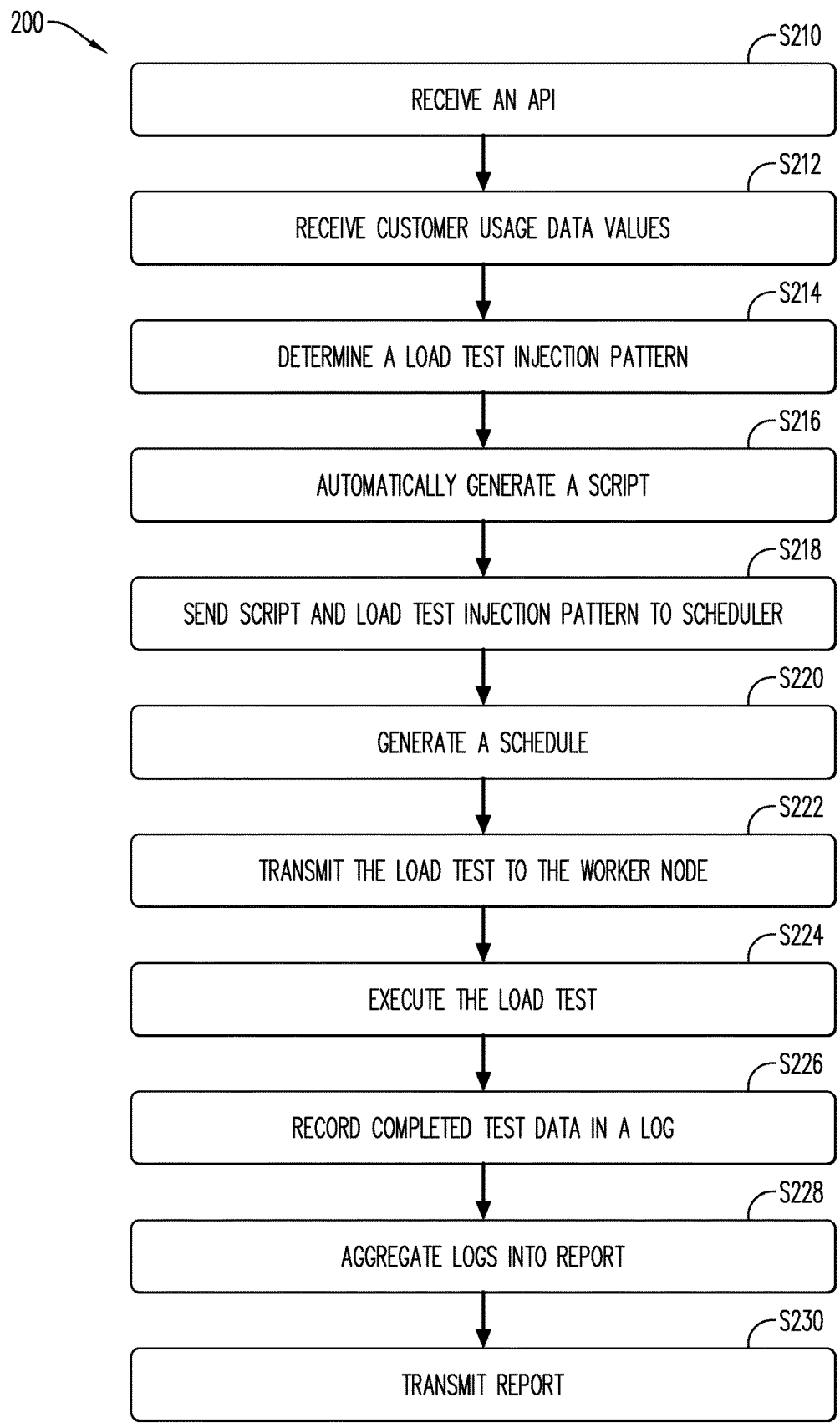
FIG. 2 is a flow diagram of a process according to some embodiments.

FIG. 2 describes a process 200 for generating a load test injection pattern 204 (FIG. 2). Process 200 may be executed by application server 140 (FIG. 1) according to some embodiments. In one or more embodiments, the application server 140 (FIG. 1) may be conditioned to perform the process 200, such that a processor 410 (FIG. 4) of the application server 140 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process 200, a developer may define a minimum and maximum number of worker nodes 110 for the system 100, based on the resources of the system, including but not limited to the hardware parameters of the system 100. Also prior to the start of the process 200, one or more load test injection patterns 105 and pattern maps 130 may be generated and stored.

Initially, at S210, the load test generation module 102 receives an API 133 from an API source 134. The received API 133 may be a whitelisted API in that the API has been accepted and approved for release to a user. In one or more embodiments, whenever an API 133 is added to the API source 134, the API is also forwarded to the load test generation module 102. In some embodiments, the load test generation module 102 may receive an indication that an API 133 has been added to the API source 134, and may then retrieve the added API. The load test generation module 102 may determine, via data analysis (e.g., a log), whether the received API 133 has been load tested. In a case the received API 133 has already been load tested, the process stops.

In a case the received API 133 has not been load tested, the process 200 continues to S212 and customer usage data values 135 for the API are received at the master node 108 of the load test generation module 102.

The customer usage data values 135 may be received with the API 133 or may be received from another source. Customer usage data values 135 may be a prediction of the number of users using the API at a same time. The customer usage data value 135 may be provided by a product owner, for example, and may be based on data related to the need for the API. The customer usage data values 135 may be provided by another source.

The API server 114 of the master node 108 may determine a load test injection pattern 105 to use based on the customer usage data values 135 at S214. In one or more embodiments, the pattern map 130 (FIG. 3) may include one or more ranges 302 of customer usage data values 135. As a non-exhaustive example, there may be three ranges 302: the first range 302a may be less than 1000 customers, the second range 302b may be 1000-2000 customers and the third range 302c may be 2000-5000 customers. The pattern map 130 may also include a load test injection pattern 105 for each range 302. The load test injection pattern 105 may define a load (i.e., number of requests) that will be entered/injected into the system at particular intervals of time. As a non-exhaustive example, the load test injection pattern 105 may be 1000 requests, 2000 requests, 5000 requests, 10000 requests, 20000 requests, 30000 requests, 40000 requests and 50000 requests, with each incremental load being triggered after a span of 180 seconds (3 minutes). With this non-exhaustive example, after every three minutes, the master node 108 may trigger/pass instructions to the worker node 110 to load the next set of users/requests into the system. It is noted that the users/requests may be asynchronous calls that do not block (or wait) for the API call to return for the server before the next call is initiated. Alternatively, the users/requests may be synchronous calls whereby an API call is returned for the server before the next call is initiated.

Then at S216, a script 131 is automatically generated for the determined load test injection pattern 105. The script 131 may represent the set of instructions/system transactions that are performed by the API as part of the load test 112. The load test 112 may be repeated transactions (i.e., requests to the API for data) performed by the API at a volume and time interval as defined by the load test injection pattern.

Next, at S218, the API server 114 sends the script 131 and the determined load test injection pattern 105 to the scheduler 116. The scheduler 116 then determines the number of worker nodes 110 needed for the load in the determined load test injection pattern 105. It is noted that a given worker node 110 may only accommodate a given number of requests. The scheduler 116, then generates a schedule 137 that schedules execution of the script 131 for one or more worker nodes 110 per the determined load test injection pattern 105 at S220. The schedule may include a time to start the execution of the one or more API transactions at a given worker node 110. As another non-exhaustive example, if node1 is to execute 10 transactions (t1, t2, t3, etc.), the scheduled time is to start t1, with the rest of the executions (t2-t10) at that node to follow per the script 131. It is noted that since different nodes may be able to accommodate a different number of requests, the scheduler 116 may take that limit into account when assigning different parts of the load test to the different worker nodes (e.g., if a worker node can only accommodate 50 requests, the scheduler will not schedule that worker node to complete the portion of the load test with 100 requests, and will instead schedule a worker node that can accommodate 100 requests to that portion of the load test).

Continuing with the non-exhaustive example above, if there will be 5000 users accessing the system concurrently, the load test injection pattern 105 may be that 1000 requests are injected for node1, then every three minutes thereafter, requests are added per the pattern, (i.e., at time 0, 1000 requests injected at node1, at time 3 minutes, 2000 requests injected at node2, at time 6 minutes, 5000 requests injected at node3, at time 9 minutes, 10000 requests injected at node4, at time 12 minutes, 20k requests injected at node5, at time 15 minutes, 30k requests injected at node6, at time 18 minutes, 40k requests injected at node7 and at 21 minutes, 50k requests injected at node8).

As another non-exhaustive example, instead of starting the successive nodes every three minutes, the successive node may begin after the immediately preceding node reaches a certain number of requests. Again, if there will be 50k requests accessing the system concurrently, the load test injection pattern 105 may be that 1000 requests are injected for node1, with a slight stagger, such that there is a one second delay between requests, for example, and when node1 reaches 900 requests, 2000 requests are injected at node2, and when node2 reaches 1800, 5000 requests are injected at node3, etc.

The scheduler 116 may transmit the schedule 137 to the API server 114, and the API server 114 may then transmit the load test 112 to the appropriate worker node at S222 at the appropriate time per the schedule 137.

Then, at S224, the worker node 110 executes the load test 112. It is noted that the execution of the load test itself may be automatic or manual.

Turning back to the process 200, every time a worker node 110 completes an execution (i.e., the worker node has completely executed the load test 112), the data associated with that completed test is recorded in a log 132 at S226. The data may include, but is not limited to, confirmation that the load test has been completed, the parameters of the load test, the average response time, the highest response time, the time to complete the load test, the peak response time (e.g., at which point of execution did the response time take the longest), etc. It is noted that initially, when execution of the load test begins, there may not be a long response time, but as more users are accessing the system concurrently, the response time of the API may take longer. Then, when all of the worker nodes 110 have completed executions, the logs 132 are aggregated by the load test generation module 102 into a report 139 in S228. The report 139 may be sent to the client 150, or any other suitable system in S230.

Figure 4:
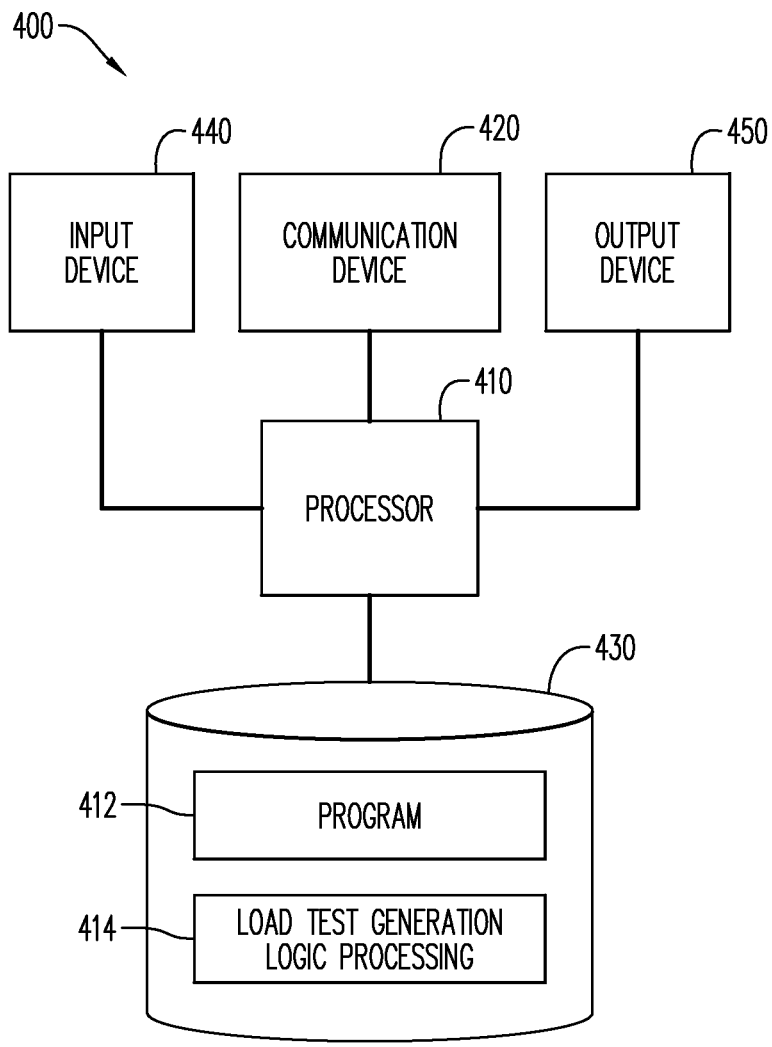
FIG. 4 is a block diagram of a system according to some embodiments.

FIG. 4 is a block diagram of apparatus 400 according to some embodiments. Apparatus 400 may comprise a general- or special-purpose computing apparatus and may execute program code to perform any of the functions described herein. Apparatus 400 may comprise an implementation of one or more elements of system 100. Apparatus 400 may include other unshown elements according to some embodiments.

Apparatus 400 includes load test generation processor 410 operatively coupled to communication device 420, data storage device 430, one or more input devices 440, one or more output devices 450 and memory 460. Communication device 420 may facilitate communication with external devices, such as application server 140. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to manipulate graphical user interfaces and to input information into apparatus 400. Output device(s) 450 may comprise, for example, a display (e.g., a display screen) a speaker, and/or a printer.

Data storage device/memory 430 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices) etc.

The storage device 430 stores a program 412 and/or load test generation platform logic 414 for controlling the processor 410. The processor 410 performs instructions of the programs 412, 414, and thereby operates in accordance with any of the embodiments described herein, including but not limited to process 200.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

The foregoing diagrams represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, cloud computing, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   an Application Programming Interface (API) source;
   a cluster including a master node and at least one worker node;
   a memory storing processor-executable program code; and
   a processing unit to execute the processor-executable program code to cause the system to:
     receive, at the cluster, an API from the API source;
     receive, at the cluster, a customer usage value for the received API;
     determine a load test injection pattern for the received API based on the customer usage value;
     schedule execution of a load test for the received API based on the determined load test injection pattern; and
     execute the load test on the at least one worker node.

2. The system of claim 1, wherein prior to determination of the load test injection pattern, it is determined the received API has not been load tested.

3. The system of claim 1, wherein the master node includes a scheduler, an API server and a controller.

4. The system of claim 3, wherein the scheduler is adapted to determine a number of worker nodes for the determined load test injection pattern.

5. The system of claim 1, further comprising processor-executable program code to cause the system to:
   automatically generate, at the master node, a script based on the determined load test injection pattern, the script defining a load that will be entered into the system at particular intervals of time.

6. The system of claim 5, further comprising processor-executable program code to cause the system to:

transmit the generated script to the at least one worker node.

7. The system of claim 1, further comprising processor-executable program code to cause the system to:
   generate a log for each completed execution of the load test at the worker node; and
   aggregate the logs into a report after execution of the load test is completed at all of the worker nodes.

8. The system of claim 7, wherein the log includes data input to the API for execution of the API and one or more performance statistics of the executed API.

9. The system of claim 1, wherein the determined load test injection pattern is based on a pattern map.

10. A computer-implemented method comprising:
    receiving, at a master node, an API from an API source;
    receiving, at the master node, a customer usage value for the received API;
    determining a load test injection pattern for the received API based on the customer usage value;
    scheduling execution of a load test for the received API based on the determined load test injection pattern; and
    executing the load test on at least one worker node.

11. The computer-implemented method of claim 10, wherein the master node includes a scheduler, an API server and a controller.

12. The computer-implemented method of claim 11, further comprising:
    determining, via the scheduler, a number of worker nodes for the determined load test injection pattern.

13. The computer-implemented method of claim 10, further comprising:
    automatically generating, at the master node, a script based on the determined load test injection pattern, the script defining a load that will be entered at particular intervals of time.

14. The computer-implemented method of claim 13, further comprising:
    transmitting the generated script to the at least one worker node.

15. The computer-implemented method of claim 10, further comprising:
    generating a log for each completed execution of the load test at the worker node; and
    aggregating the logs into a report after execution of the load test is completed at all of the worker nodes.

16. The computer-implemented method of claim 15, wherein the log includes data input to the API for execution of the API and one or more performance statistics of the executed API.

17. A non-transitory, computer readable medium having executable instructions stored therein to perform a method, the method comprising:
    receiving, at a master node, an API from an API source;
    receiving, at the master node, a customer usage value for the received API;
    determining a load test injection pattern for the received API based on the customer usage value;
    scheduling execution of a load test for the received API based on the determined load test injection pattern; and
    executing the load test on at least one worker node.

18. The non-transitory, computer readable medium of claim 17, the method further comprising:
    determining a number of worker nodes for the determined load test injection pattern.

19. The non-transitory, computer readable medium of claim 17, the method further comprising:

automatically generating, at the master node, a script based on the determined load test injection pattern, the script defining a load that will be entered at particular intervals of time; and transmitting the generated script to the at least one worker node.

20. The non-transitory, computer readable medium of claim 17, the method further comprising:

generating a log for each completed execution of the load test at the worker node; and aggregating the logs into a report after execution of the load test is completed at all of the worker nodes.

\* \* \* \* \*